United States Patent
Li et al.

(10) Patent No.: US 7,293,804 B2
(45) Date of Patent: Nov. 13, 2007

(54) PRESS FITTING

(75) Inventors: Yong Li, Foshan (CN); Hui Liang, Foshan (CN); Xiaobin Feng, Foshan (CN)

(73) Assignee: Foshan Rifeng Enterprise Co., Ltd., Foshan, Guangdong Province (CN)

( * ) Notice: Subject to any disclaimer, the term of this patent is extended or adjusted under 35 U.S.C. 154(b) by 95 days.

(21) Appl. No.: 11/136,921

(22) Filed: May 25, 2005

(65) Prior Publication Data

US 2006/0220378 A1     Oct. 5, 2006

(30) Foreign Application Priority Data

Mar. 31, 2005    (CN)    ............ 200520056332

(51) Int. Cl.
*F16L 33/00* (2006.01)

(52) U.S. Cl. ................... 285/256; 285/242

(58) Field of Classification Search ......... 285/242, 285/256
See application file for complete search history.

(56) References Cited

U.S. PATENT DOCUMENTS

| 1,129,979 | A | * | 3/1915 | Hewitt et al. | ............ | 285/256 |
| 2,687,904 | A | * | 8/1954 | Tornblom | ............ | 285/222.4 |
| 4,544,187 | A | * | 10/1985 | Smith | ............ | 285/256 |
| 6,450,549 | B1 | * | 9/2002 | Schutz | ............ | 285/256 |
| 6,598,906 | B2 | * | 7/2003 | Brugmann | ............ | 285/256 |
| 6,874,823 | B2 | * | 4/2005 | Viegener | ............ | 285/256 |

* cited by examiner

*Primary Examiner*—David Bochna
(74) *Attorney, Agent, or Firm*—Charles E. Baxley

(57) ABSTRACT

A press fitting includes a pipe connector, a nipple, a check ring, a sealing ring, a pressure sleeve. The pressure sleeve is locked within the check ring, which has an inlet groove, a positioning annular groove connected with the inlet groove, and the positioning annular groove has larger internal diameter than that of the inlet groove. The pressure sleeve has an extension section on its end, and the dimension of the external diameter of the larger-diameter end of the extension section is between the dimension of the internal diameter of the inlet groove of the check ring and that of the internal diameter of the positioning annular groove of the check ring. The press fitting involves good coaxiality between the pressure sleeve and the check ring, good fixity of the pressure sleeve, and can be operated easily and utilized widely in industrial applications.

2 Claims, 2 Drawing Sheets

PRESS FITTING

BACKGROUND OF THE UTILITY MODEL

With the prevalence of polyethylene/aluminum/polyethylene pipes, more and more research has been done on pipe coupling joint. German Patent DE 199856999A1 disclosed a pipe coupling joint, wherein, the pressure sleeve is fixed to the coupling fitting by a ring-shaped accessory. The end of the inner wall of the pressure sleeve is located at the shoulder section of the coupling fitting, thereby the pressure sleeve can be maintained precisely coaxial with the coupling fitting for a long term. However, the pressure sleeve, which is usually made of metal such as steel and copper, of the joint contacts to the coupling fitting directly, resulting electrochemical corrosion between different metals. Also, a utility model ZL 01274991 granted to this applicant in year 2002 disclosed a coupling joint, said joint contains technical features including a check ring; whereas the configuration of that check ring can not ensure good coaxiality and fixity between the pressure sleeve and the check ring, consequently, the pressure sleeve and check ring are easily disengaged during assembling, resulting hardship and inconvenience during installing.

SUMMARY OF THE UTILITY MODEL

The main objective of the present utility model is to provide a press fitting with good coaxiality between the pressure sleeve and the check ring, and with good fixity of the pressure sleeve.

This utility model is realized by the following technical scheme: a press fitting, comprising a pipe connector, a nipple, a check ring, a sealing ring, a pressure sleeve, etc., said check ring is sleeved into the end groove at the end section of said nipple of said pipe connector, said sealing ring is fit to the sealing groove of said nipple, said pressure sleeve is locked within said check ring, said check ring has an inlet groove and a positioning annular groove which is connected with said inlet groove, and said positioning annular groove has a larger internal diameter than that of said inlet groove; said pressure sleeve has an extension section on its end, and the dimension of the external diameter of the larger-diameter end of said extension section is between the dimension of the internal diameter of said inlet groove of said check ring and that of the internal diameter of said positioning annular groove of said check ring.

In this utility model, the pressure sleeve and the check ring is closely fitted, which ensures good coaxiality between the pressure sleeve and the check ring, and good fixity of the pressure sleeve, excluding bad effect such as deviation and deflection during assembling.

BRIEF DESCRIPTION OF THE DRAWINGS

The present utility model will be further described in combination with the accompanying drawings and the embodiments.

DETAILED DESCRIPTION OF THE PREFERRED EMBODIMENTS

Figure 1:
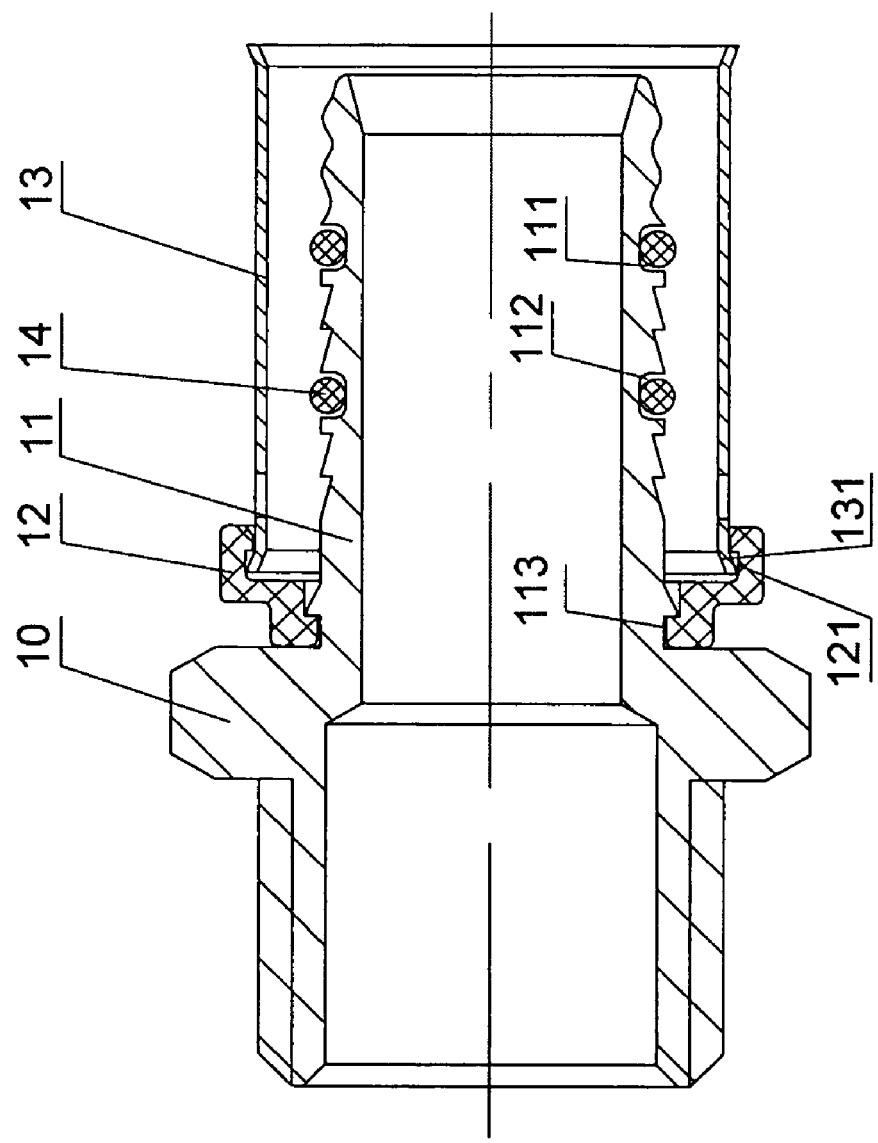
FIG. 1 is a schematic view showing the assembling of the present utility model.
Figure 2:
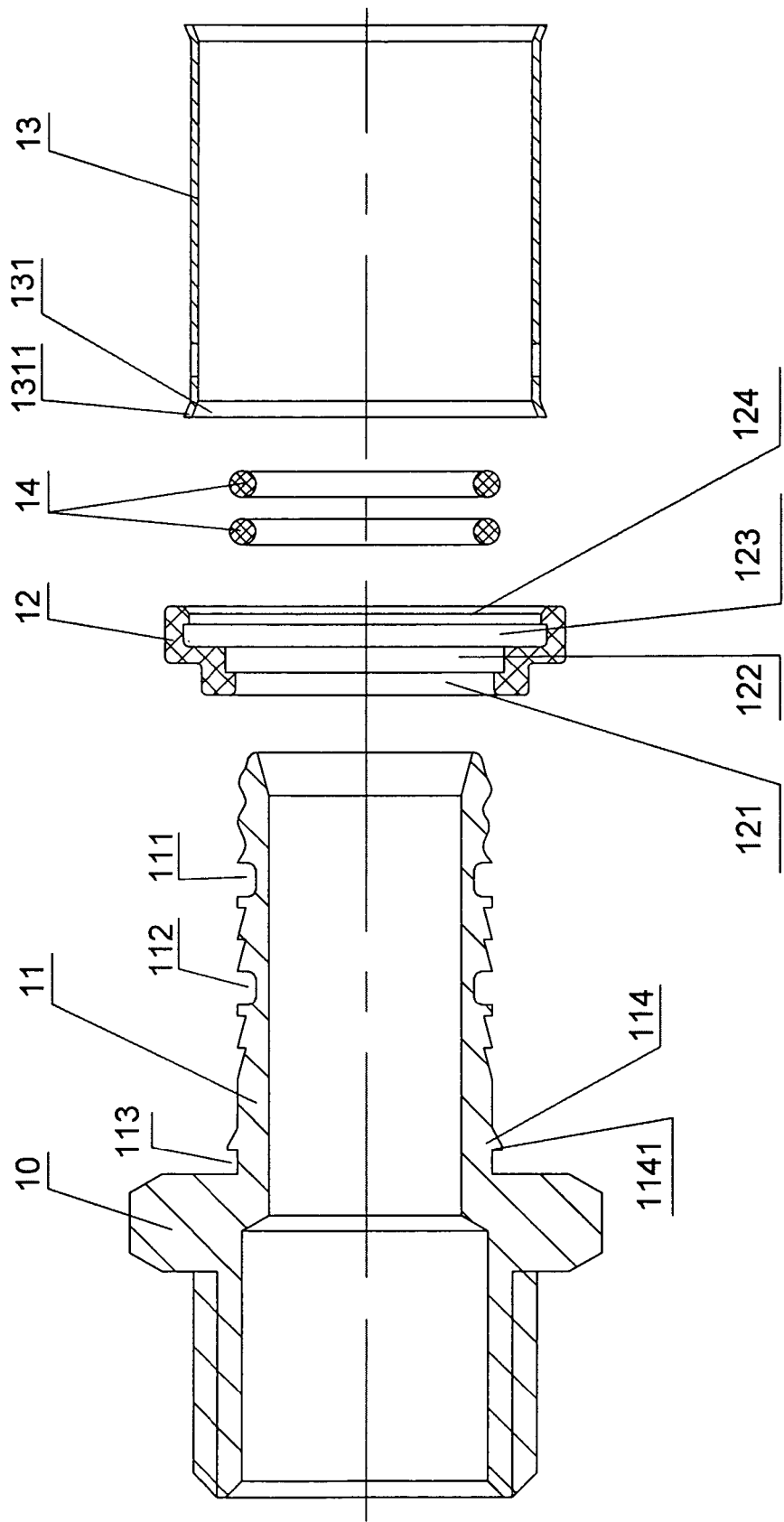
FIG. 2 is an explosive view of the present utility model.

As shown in FIG. 1 and FIG. 2, according to one embodiment of the utility model, a press fitting comprises following components:

A pipe connector 10, wherein on the end section of the nipple 11 of said pipe connector 10 is carved an end groove 113, with which is connected the larger-diameter end section 1141 of the trump-shaped outwardly protruding bump 114, wherein the larger-diameter end section 1141 of the nipple 11 is the section having the largest diameter. Two sealing grooves 111 and 112 are provided on the middle section of the nipple 11, respectively dividing the nipple 11 into three sections of unequal lengths, wherein the section from the first sealing groove 111 to the free end of the nipple is ripple-shaped, and the remaining section is serrate-shaped.

A check ring 12, which is carved with four grooves in sequence: the first stage annular groove 121, the second stage annular groove 122, the positioning annular groove 123 and the inlet groove 124, the internal diameters of which are ascending in following sequence: the first stage annular groove 121, the second stage annular groove 122, the inlet groove 124 and the positioning annular groove 123. The dimension of the external diameter of the larger-diameter end 1141 of the expanding protruding block 114 is between the dimension of the internal diameter of the first stage annular groove 121 and that of the internal diameter of the second stage annular groove 122. The check ring 12 can be made of macromolecule materials such as plastic or rubber.

Two identical sealing rings 14, coupling with the sealing grooves 111 and 112 respectively.

A pressure sleeve 13, which has an extension section 131 on its end. The extension section 131 is trump-shaped and the dimension of the external diameter of its larger-diameter end 1311 is between the dimension of the internal diameter of the positioning annular groove 123 and that of the internal diameter of the inlet groove 124. The pressure sleeve 13 can be made of metal materials such as stainless steel or copper.

As an alternative embodiment of this utility model, the outer surface of the nipple 11 can be rippled, serrated, labyrinth-like, or any combination of the above.

During assembling, the check ring 12 is fixed in the end groove 113 of the pipe connector 10, and because the dimension of the external diameter of larger-diameter end 1141 of the outwardly protruding bump 114 is between the dimension of the internal diameter of the first stage annular groove 121 and that of the internal diameter of the second stage annular groove 122, the check ring 12 can hardly be pulled out after being forced into the end groove 113. The fit between the first stage annular groove 121 and the end groove 113 of the check ring 12 is clearance fit, thereby the check ring 12 can move freely within certain range when set into the nipple 11, therefore the coaxiality between the pressure sleeve 13 and the nipple 11 is automatically adjusted, deviation between coupling components generated during manufacture is eliminated, and resistance when inserting the pipe fitting is reduced.

The pressure sleeve 13 has an extension section 131. The fit between said extension section 131 and said inlet groove 124 of the check ring 12 is a close fit. The fit between said extension section 131 and the positioning annular groove 123 is an interference fit. Accordingly, after being locked within the check ring 12, with the aid of the inlet groove 124, the pressure sleeve 13 is fixed within the check ring 12, ensuring sufficient strength and durability.

When the pipe fitting is inserted into the coupling joint, external force is exerted on the pressure sleeve 13 and deforms it to clamp the pipe fitting tightly. Because of the structure of the nipple 11, the pipe fitting locks the nipple 11 tightly under external force. Furthermore, since two sealing rings 14 are locked within the sealing groove 111 and 112 respectively, this kind of coupling joint can be used without leaking even in situation of relatively large temperature variation.

This utility model can be applied to straight, elbow or tee fitting having one or more ends.

What is claimed is:

1. A press fitting, comprising a pipe connector, a nipple, a check ring and a sealing ring, a pressure sleeve, wherein said check ring is sleeved into an end groove at the end section of said nipple of said pipe connector, said sealing ring is fit to a sealing groove of said nipple, said pressure sleeve is locked within said check ring, said check ring has an inlet groove and a positioning annular groove which is connected with said inlet groove, said positioning annular groove has a larger internal diameter than that of said inlet groove; said pressure sleeve has an extension section on its end, the dimension of the external diameter of the larger-diameter end of said extension section is between the dimension of the internal diameter of said inlet groove of said check ring and that of the internal diameter of said positioning annular groove of said check ring, said extension section is trumpet-shaped, the section from the first sealing groove to the free end of said nipple is ripple-shaped, and the remaining section of said nipple is serrate-shaped.

2. The press fitting according to claim 1, wherein there are two sealing grooves, and there are two sealing rings.

* * * * *